Dec. 12, 1939.  J. F. MADIGAN  2,182,969
SAND VALVE FOR MOTOR VEHICLES
Filed June 21, 1937    2 Sheets-Sheet 1

Dec. 12, 1939.  J. F. MADIGAN  2,182,969
SAND VALVE FOR MOTOR VEHICLES
Filed June 21, 1937   2 Sheets-Sheet 2

INVENTOR.
John F. Madigan
BY
Rasmussen & Brugman
ATTORNEYS.

Patented Dec. 12, 1939

2,182,969

UNITED STATES PATENT OFFICE 2,182,969

SAND VALVE FOR MOTOR VEHICLES

John F. Madigan, Chicago, Ill., assignor of one-third to Maurice Stans and one-third to Frank R. Beane, both of Chicago, Ill.

Application June 21, 1937, Serial No. 149,326

1 Claim. (Cl. 291—34)

This invention relates in general to distributing apparatus and more particularly to sand distributing apparatus for use on motor vehicles.

An important object of the invention is the provision of a sand distributing apparatus for motor vehicles which will automatically scatter or distribute a uniform layer of finely divided or pulverized material, such as sand or any other suitable surface friction material, before the several wheels of the motor vehicle in order to facilitate stopping or starting when the pavement or road is wet or slippery.

Another important object of the invention is the provision of a sand distributing apparatus for motor vehicles which is actuated simultaneously with the setting of the brakes thereby inducing a flow of sand or other suitable friction material until the brakes are released or the flow of such friction material is otherwise cut off at the driver's option.

Numerous other objects and advantages of the invention will be apparent as it is better understood from the following description, which, when taken in connection with the accompanying drawings, discloses a preferred embodiment thereof.

In the drawings,

Fig. 3 is a sectional view of the valve mechanism taken substantially on the line 3—3 in Fig. 2.

Figure 1:
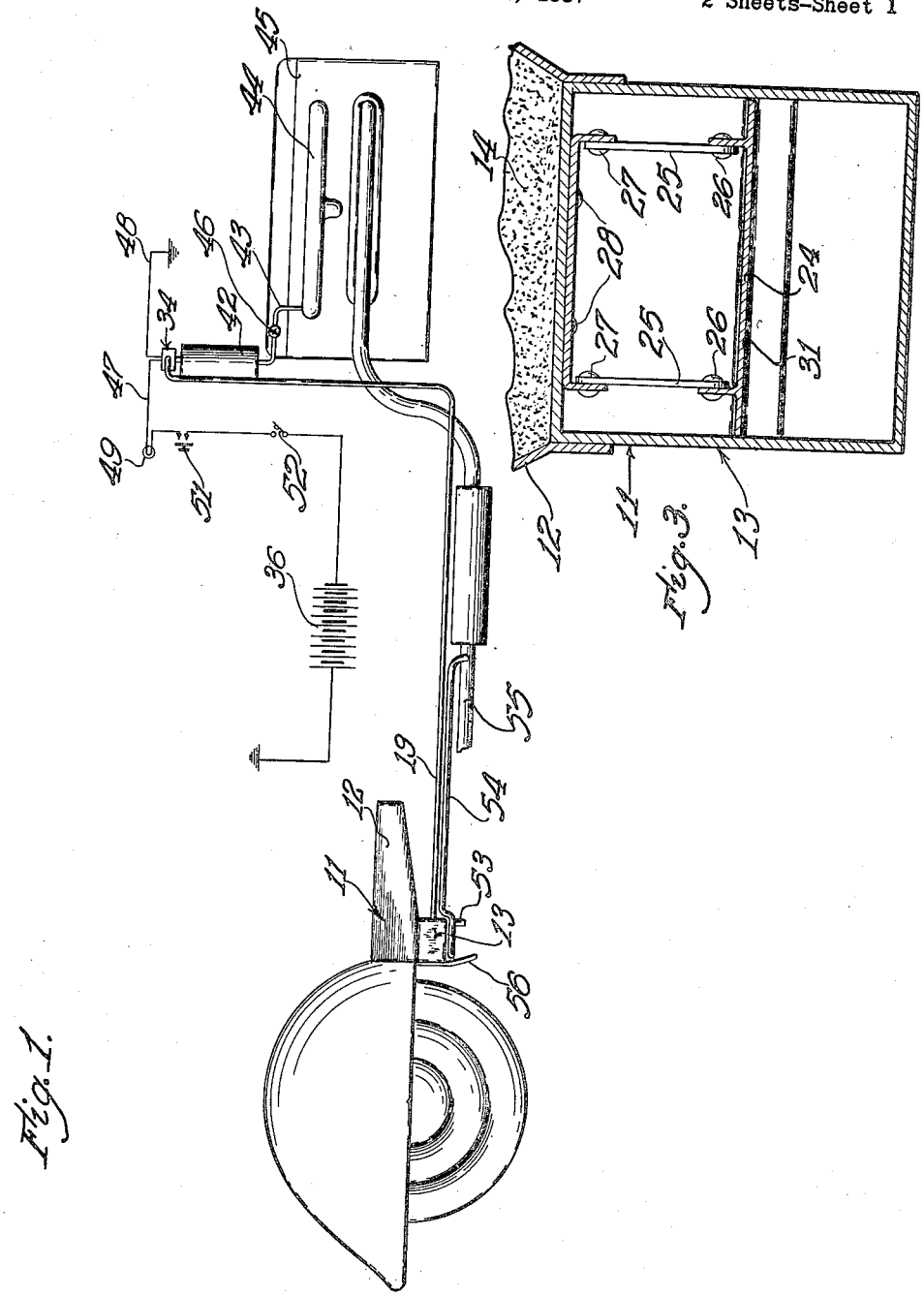
Figure 1 is a schematic drawing illustrating, in part, a motor vehicle with the distributing apparatus adjacent one wheel.

Referring more particularly to the drawings, reference numeral 11 indicates in general the preferred embodiment of the invention and comprises a container or compartment 12 and a valve mechanism 13. The container or compartment 12 is adapted to store or hold a quantity of finely pulverized surface friction material such as sand, or the like, 14.

Figure 2:
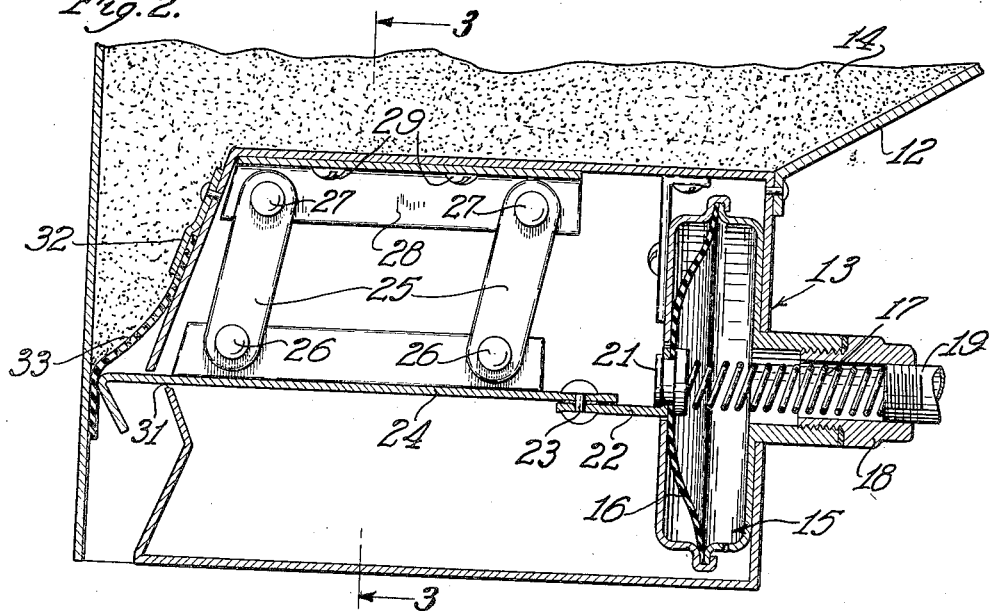
Fig. 2 is a longitudinal sectional view of the valve mechanism used in the preferred embodiment thereof.

The valve mechanism 13, as shown more clearly in Fig. 2, is actuated by a diaphragm member 15, which comprises a flexible member 16, a tension spring 17 and an adjusting nut 18 having a tubular member 19 fastened therein. Attached to the flexible member 16 adjacent its center thereof is a rivet member 21 having a recess therein in which the spring 17 resides. Also fastened to the rivet member 21 is a bar 22 upon which is pivotally mounted at 23 a sliding member 24.

The member 24 acts as a cut-off member to stop the flow of finely pulverized surface friction material 14. This is accomplished by means of hinge-like members 25 which are pivotally mounted upon the member 24 at 26 and are also pivotally mounted at 27 upon a depending flange member 28. The flange member 28 is fastened to the upper surface of the valve mechanism 13 by means of screws, or the like, 29. A sliding member 24 passes through an aperture 31 in the casing of the valve mechanism 13. Fastened to the casing of the valve mechanism 13 by means of a clamping member 32 is a flexible strip of material 33 which forms a pocket for the sand 14.

Figure 4:
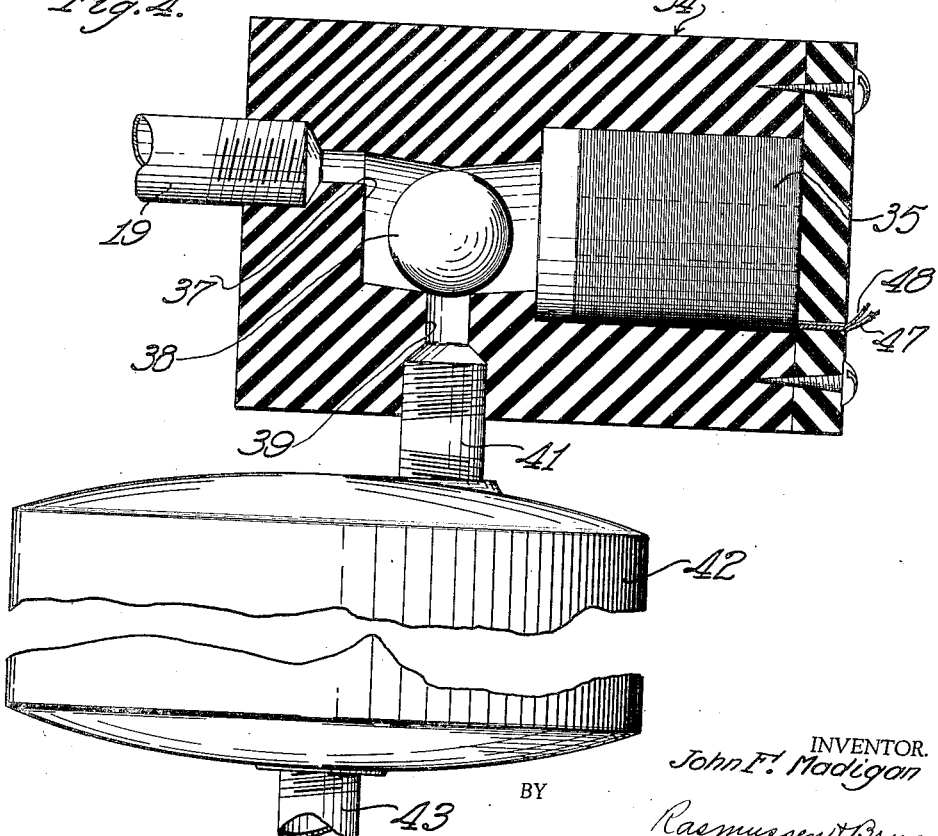
Fig. 4 is an enlarged longitudinal sectional view of a magnetic valve mechanism which is used to regulate the motivating force in the operation of the distributing apparatus.

The tube 19 extends from the adjusting screw 18 to a magnetic valve, indicated generally by reference numeral 34. The outer casing of the valve 34 is made of a non-conducting material, such as hard rubber or the like, and is connected to a storage battery 36, or other similar source of energy that might be used in a motor vehicle. Centrally located in the valve 34 is a recess 37 in which is located a metallic sphere, or the like, 38. The recess 37 is cylindrical in shape having its diameter slightly larger than the diameter of the ball or sphere 38. As seen in Fig. 4, the recess 37 has its longitudinal surface slightly recessed so that when the induction coil 35 is deenergized, the ball 38 will naturally roll away from the coil 35 and seat itself upon an aperture 39 which is located within the outer casing member of the valve 34.

A short tubular member 41 is fastened in the casing of the valve mechanism 34 adjacent the aperture 39 and is in turn connected to a vacuum tank 42. The vacuum tank 42 is connected by means of a tube 43 which is in turn connected to an intake manifold 44 of the engine 45. A check valve 46 is placed in the tube 43, the purpose for which will be later described more fully.

The induction coil 35 is connected to the battery 36 by means of the usual electrical connecters 47 and 48. The electrical connecter 47 is connected to a visual indicator such as a small lamp, or the like, 49 and also has a manually operable switch 51 connected thereto. A second switch 52 is also connected to the electrical connecter 47 and is the same switch that operates the warning signal or stop light when the brake pedal of the motor vehicle is actuated.

A description of the method and operation of the instant apparatus just described is as follows:

It has been found heretofore that when the pavement is slippery or slick, due to sleet, rain, or inclement weather, the driver of the motor vehicle experiences difficulty in coming to a stop without skidding. In order to actuate this device, the manually operable switch 51 is first closed by the operator and thereafter upon actuating the braking mechanism (not shown), the switch 52 is also closed.

Upon the closing of the switch 52, the lamp 49 becomes lighted. At the same time, the sphere or ball 38 is drawn or pulled away from the aperture 39 by reason of the energizing of the induction coil 35. When the ball 38 is pulled away from the aperture 39, a suction is created in the tubing 19, due to the vacuum which is formed in the vacuum tank 42 by reason of the tubing 43 connecting with the manifold 44. The suction in the tubing 19 causes the flexible member 16 in the diaphragm member 15 to move from left to right (Fig. 2). The movement of the member 16 in turn causes the bar 22 to move in the same direction pulling the member 24 with it. The movement of the member 24 causes an opening to be formed adjacent the aperture 31 which will allow the finely pulverized surface friction material 14 to flow past the flexible strip 33 and a fine layer of this material will in turn be spread before the wheels of the motor vehicle. This fine layer of surface friction material 14 will enable the tires to more easily grip the surface of the roadway and prevent any skidding or sliding that will usually result when the tires are in contact with the slick surface of the roadway.

It frequently happens that when the operator causes the motor vehicle to come to a sudden stop, the sudden deceleration will also stop the motor 45. By having the check valve 46 placed in the tubing 43, the vacuum in the tank 42 is not lost and the valve mechanism 13 will continue to function, thus assuring a positive operation of the valve mechanism 13.

To further insure the positive operation of the sliding member 24 and the flowing of the finely pulverized material 14, heat may be applied by means of a coil 53 which is in turn connected, by means of a tubing 54, to an exhaust pipe 55. Thus a continuous source of heat is applied to the valve mechanism 13 to keep the same free from any accumulations of ice and water and allow the sand 14 to flow freely therefrom. Also, an apron 56 may be fastened adjacent the opening in the casing of the valve mechanism 13 so that it will shield the opening from any dirt or spray that might be thrown up against the opening by the revolving wheels of the motor vehicle.

Accordingly, it will be apparent that the stopping of a motor vehicle on a wet or slippery road is not merely greatly facilitated, but the motor vehicle may be easily stopped without danger of skidding or sliding.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a sanding device for vehicles, a sand storage compartment having a bottom wall forming a discharge outlet for the sand, a rubber apron secured at its upper end to one wall of said discharge outlet and depending freely therebelow, a horizontally disposed sliding member mounted to cooperate at one end with said apron to move the lower end thereof against an opposed wall portion of said outlet to close said sand outlet, spring means normally urging said slide to such closed position, and means for moving said slide against the action of said spring to open position to permit said apron to fall out of closing position and allow the sand to be discharged from said storage compartment.

JOHN F. MADIGAN.